United States Patent [19]

Swenson

[11] 4,064,902
[45] Dec. 27, 1977

[54] CURB BOX

[76] Inventor: John Gordon Swenson, 1210 Beaver Drive, Erie, Pa. 16509

[21] Appl. No.: 701,288

[22] Filed: June 30, 1976

[51] Int. Cl.² .............................................. F16L 5/00
[52] U.S. Cl. .................................... 137/370; 137/371
[58] Field of Search ............... 137/364, 365, 366, 367, 137/368, 369, 370, 371; 92/177

[56] References Cited

U.S. PATENT DOCUMENTS

| 204,010 | 5/1878 | Donande | 137/367 X |
|---|---|---|---|
| 380,308 | 4/1888 | Barry, Jr. | 137/370 |
| 997,412 | 7/1911 | Paradine | 137/369 X |
| 1,215,250 | 2/1917 | Cassidy | 137/367 |
| 1,486,707 | 3/1924 | Warner | 137/371 |
| 2,176,399 | 10/1939 | Garrett | 137/371 X |
| 2,691,394 | 10/1954 | Mueller et al. | 137/366 |
| 2,983,256 | 5/1961 | Seeloff | 92/177 X |
| 3,338,141 | 8/1967 | Ramsay | 92/177 X |

*Primary Examiner*—Irwin C. Cohen
*Attorney, Agent, or Firm*—Charles L. Lovercheck

[57] ABSTRACT

A curb box having a cast base housing slidably receiving a threaded pipe which is distorted to oval shape above the threaded end and a riser having a threaded upper end and outwardly-extending ears in the lower end non-rotatably received in the oval part of the threaded upper part of the threaded pipe whereby the riser pipe can be telescopically moved vertically and have a threaded cap supported on the upper end thereof.

Curb boxes of the type of the present invention have notably been made with base housing and the pipe extending upwardly therefrom cast in one piece and a riser pipe slidably received in the one-piece base. Applicant has discovered that by threading the base housing and connecting a threaded pipe to it and distorting the threaded pipe to oval shape so that a vertically-extending pipe can be slidably but non-rotatably received therein, the said curb box can be made much simpler and at lower cost.

2 Claims, 4 Drawing Figures

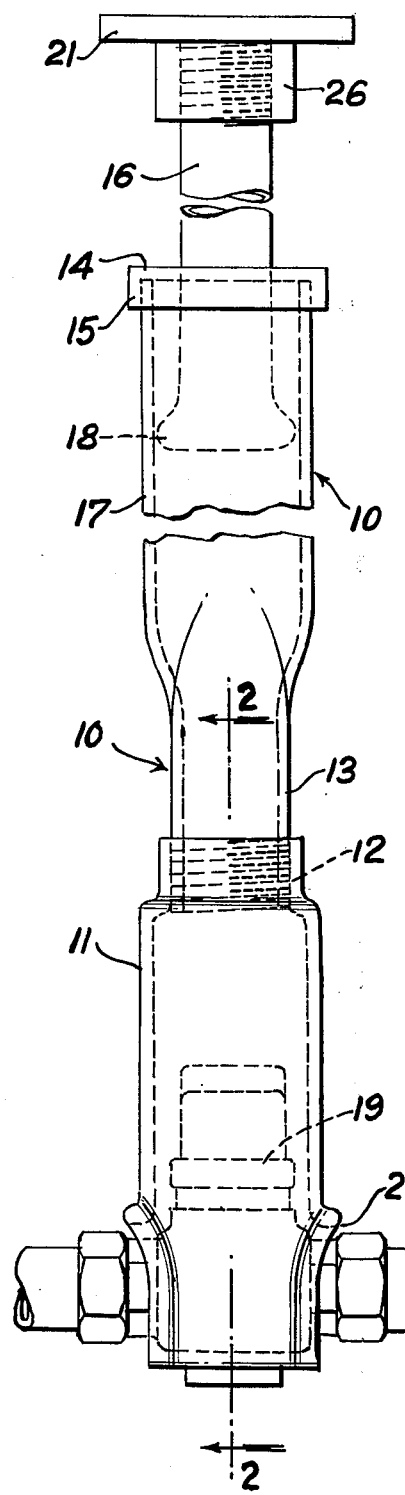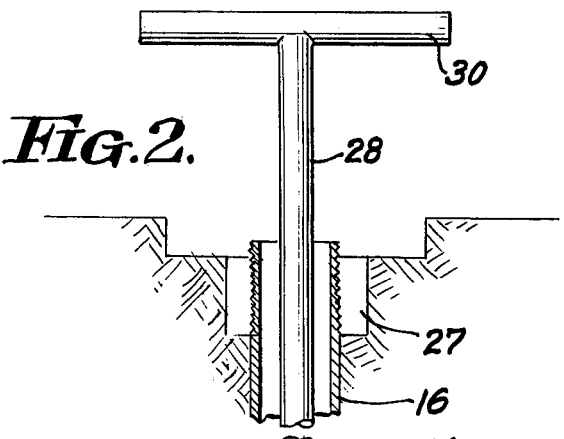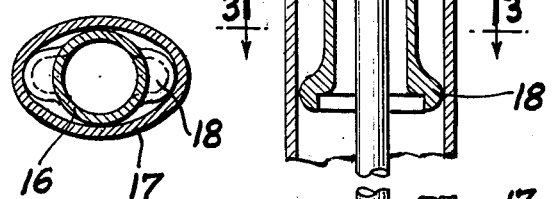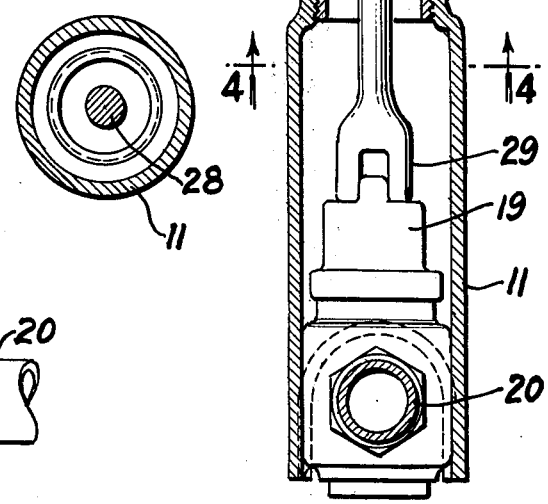

CURB BOX

REFERENCE TO PRIOR ART

A curb box of the general type disclosed herein is shown in U.S. Pat. No. 3,537,471.

OBJECTS OF THE INVENTION

It is an object of the invention to provide an improved curb box.

Another object of the invention is to provide a curb box that is simple in construction, economical to use and simple and efficient to use.

Another object of the invention is to provide a curb box made of a cast part with a perpendicular pipe threadably received therein to reduce the cost thereof.

With the above and other objects in view, the present invention consists of the combination and arrangement of parts hereinafter more fully described, illustrated in the accompanhing drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

FIG. 1 is a side view of the curb box according to the invention.

FIG. 2 is a cross-sectional view taken on line 2—2 of FIG. 1.

FIG. 3 is a cross-sectional view taken on line 3—3 of FIG. 2.

FIG. 4 is a top view of the curb box.

DETAILED DESCRIPTION OF THE DRAWINGS

Now, with more particular reference to the drawings, the curb box saddle 10 is shown supported over a valve 19 on a water main 20. The base housing 11 is made of unitary construction and it has a saddle portion that may receive the pipe at the two sides of the valve. The base housing has an open bottom 22 and a recess defining a saddle part 23 that receives the pipe and rests on top of the sides of the valve 19.

The base housing 11 is in the form of a hollow cylinder having an open bottom and a threaded opening 12 at its upper end. Threaded opening 12 receives the threaded lower end of the pipe 13. Pipe 13 is distorted to oval shape at its intermediate portion 17 so that the ears 18 of the stand pipe 16 are slidably and non-rotatably received in the oval-shaped portion.

The cap 14 is adapted to rest on the upper end of the pipe 13 at ground level. Cap 14 has a downwardly extending flange 15 and a first stand pipe 16 is slidably received in the cap 14. The opening 24 defined by the flange 25 is sufficiently large to receive the major diameter of the oval-shaped portion 17 of the pipe. The opening 30 in cap 14 is round and of substantially the same diameter as the outside diameter of the stand pipe 16.

The upper end of stand pipe 16 is threaded at 26 to threadably receive the downward-extending threaded flange 27 of cap 21. Cap 21 is supported at ground level when the device is installed in use over a water main. Hollow base housing 11 is set over the valve 19 with the pipe 13 extending out of recesses 22. The soil is backfilled around the saddle 23, pipes 13 and 15 are pulled up and cap 21 is put in place, flush with the ground. When a workman wishes to operate valve 19, he unscrews the cap 21 from the upper end of stand pipe 16. Rotation of the stand pipe is resisted by the ears 18 in the oval-shaped portion 17 of the pipe. The workman then inserts his tool 28 in the pipe and grasps valve 18 with the lower end 29 of the tool and rotates the handle 30 to operate the valve.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A curb box saddle comprising,
   a hollow, cylindrical, open-bottomed base housing made of unitary cast material and adapted to rest on a water main having a valve,
   the lower end of said base housing being adapted to receive said valve,
   pipe means on the upper end of said base housing formed into an oval shape having a major diameter and a minor diameter, means securing said pipe means to said base housing
   a stand pipe slidably received in said pipe means,
   said stand pipe having a diameter approximately equal to the said minor diameter of said pipe means,
   said stand pipe having outwardly extending ears on its lower end extending outwardly a distance approximately equal to said major diameter,
   and a cap separate supported on the upper end of said pipe means,
   said cap having a downwardly extending flange receiving the upper end of said pipe means,
   a central hole in said cap slidably receiving said upper stand pipe.

2. The curb box saddle recited in claim 1 wherein, said base housing has an internal thread on its upper end and said pipe means comprises a pipe threadably received in said threaded end defining said securing means.

* * * * *